I. A. PRYDE.
HANDLE SOLDERING MACHINE.
APPLICATION FILED DEC. 24, 1917.
1,371,262.
Patented Mar. 15, 1921.
4 SHEETS—SHEET 3.
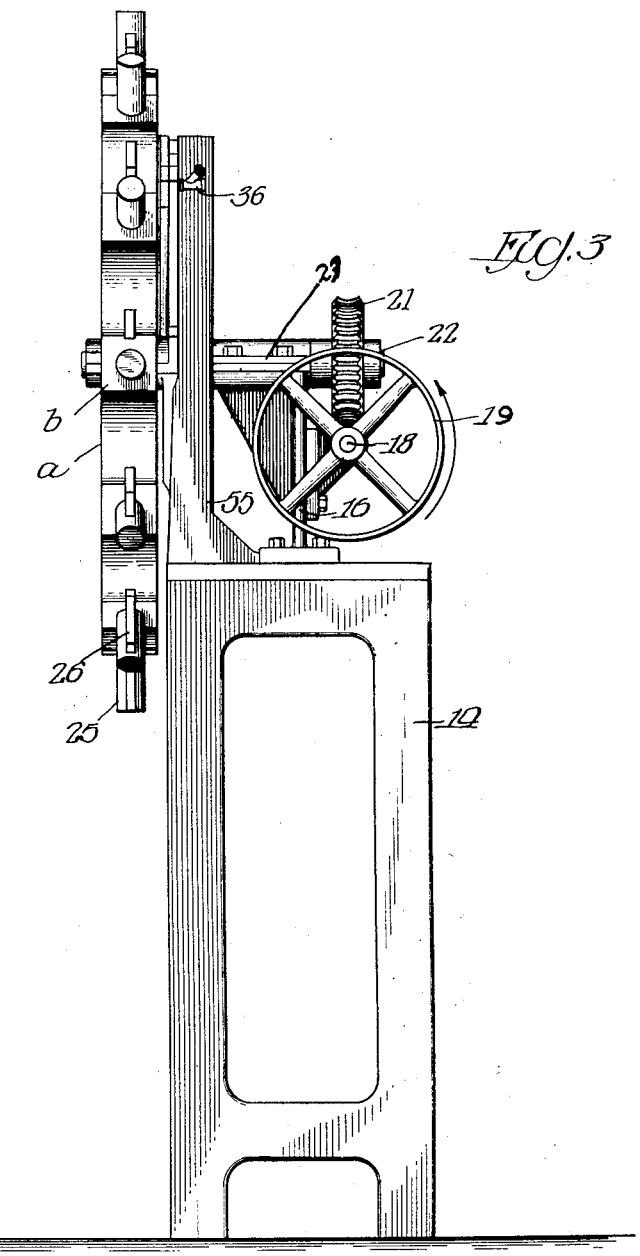

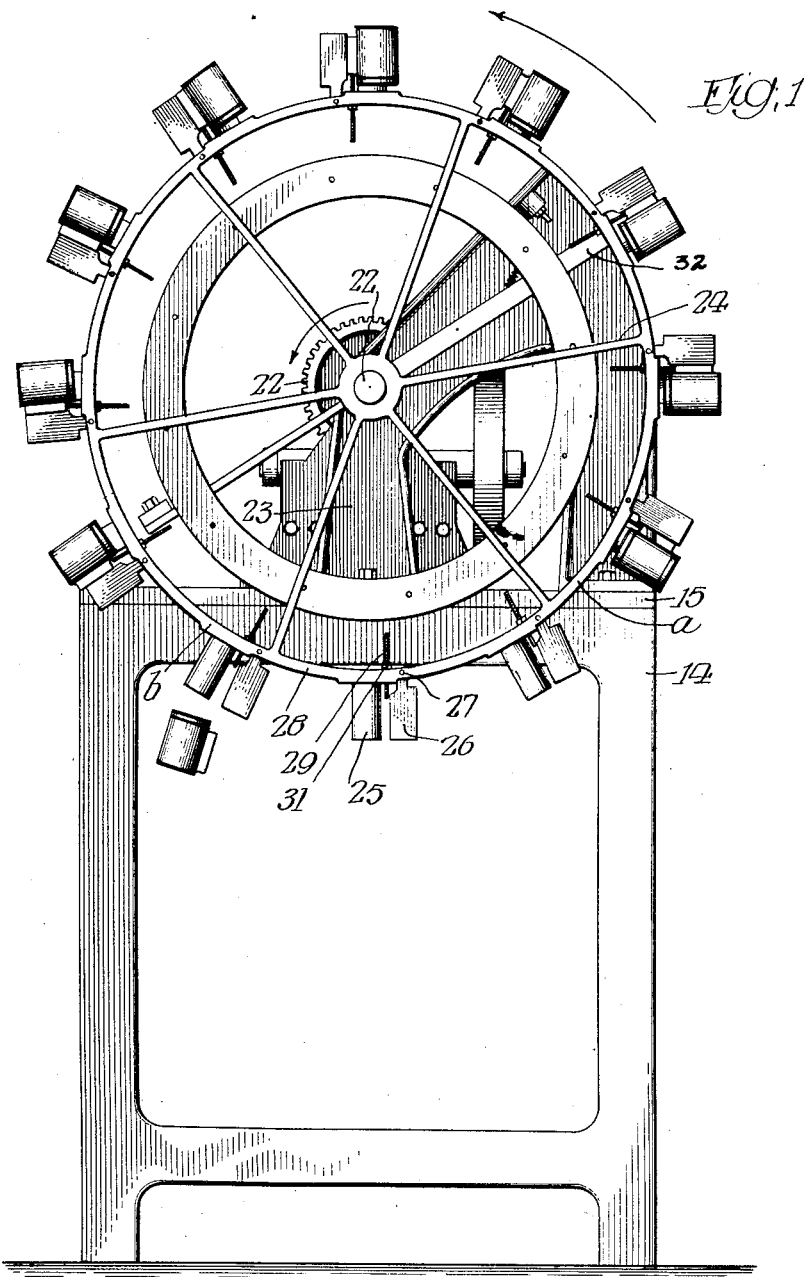

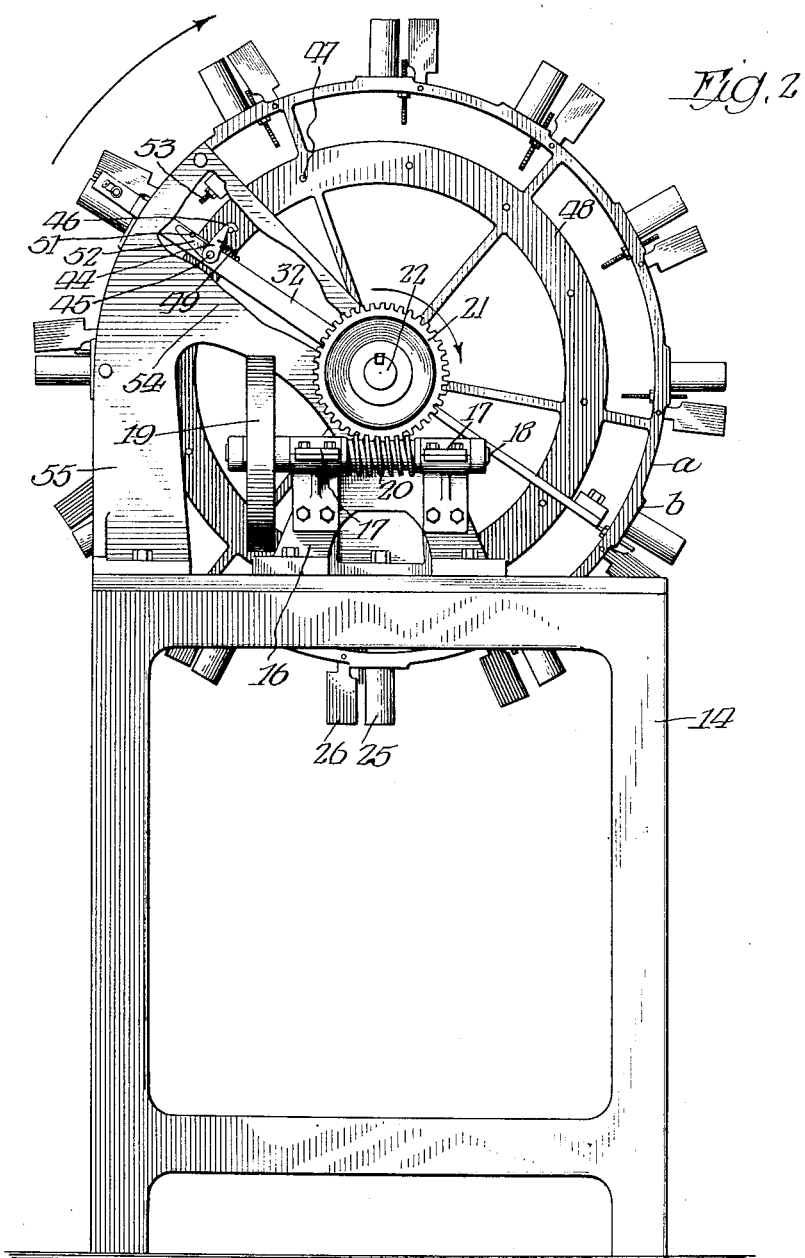

I. A. PRYDE.
HANDLE SOLDERING MACHINE.
APPLICATION FILED DEC. 24, 1917.
1,371,262.
Patented Mar. 15, 1921.
4 SHEETS—SHEET 4.
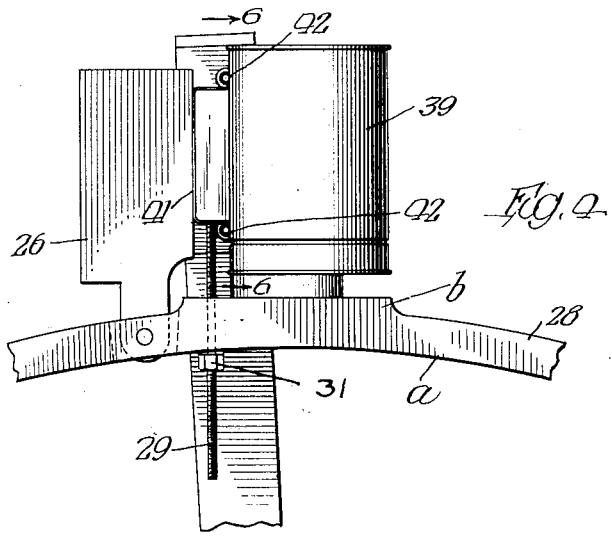
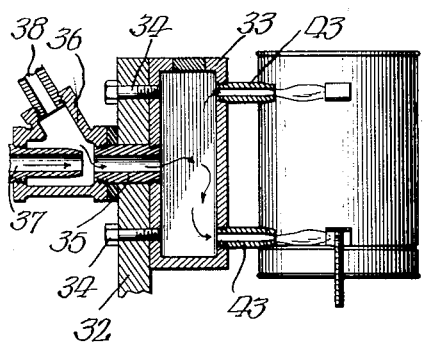
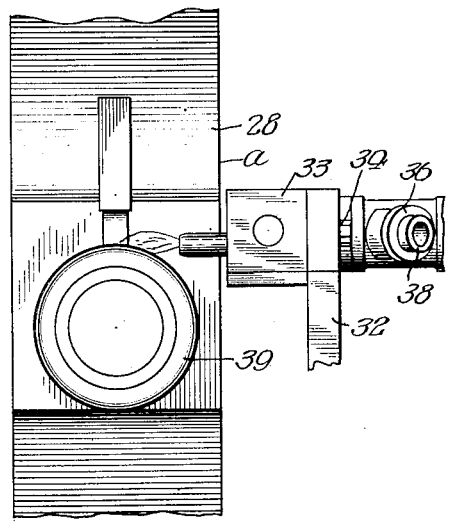
WITNESSES:
INVENTOR
BY
ATTORNEYS

UNITED STATES PATENT OFFICE.

IRVING ADAM PRYDE, OF RICHMOND, VIRGINIA, ASSIGNOR TO AMERICAN CAN COMPANY, OF NEW YORK, N. Y., A CORPORATION OF NEW JERSEY.

HANDLE-SOLDERING MACHINE.

1,371,262.　　　　　Specification of Letters Patent.　　Patented Mar. 15, 1921.

Application filed December 24, 1917. Serial No. 208,603.

*To all whom it may concern:*

Be it known that I, IRVING ADAM PRYDE, a citizen of the United States, residing in Richmond, in the county of Henrico and State of Virginia, have invented a new and useful Improvement in Handle-Soldering Machines, of which the following is a specification.

This invention has for its principal object the provision of a machine for soldering sheet metal handles to sheet metal bodies, to provide a cup or like vessel. Prior to my invention it has been the usual custom to solder handles on the bodies by hand—an expensive and frequently inaccurate operation.

This invention has for an aim the provision of an apparatus or machine of semi-automatic character into which the handles and bodies may be fed by hand and thereafter of automatic operation, which includes the soldering of the handles to the bodies and the discharge of the finished articles from the apparatus.

A further object of the invention is the provision of a structure accomplishing this which will consist of a new and simple apparatus so constructed and arranged as to be strong and permanently efficient and unlikely to require either the attention of skilled attendants or frequent or expensive repair or replacement.

Numerous other object and advantages of the invention will be apparent as it is better understood from the following description when considered in connection with the accompanying drawing illustrating a preferred embodiment thereof.

Referring to drawing:

Figure 1 is a front view of the machine embodying my present invention.

Fig. 2 is a back view of the same with parts broken away to show internal views of construction.

Fig. 3 is an end elevation of such a machine.

Fig. 4 is an enlarged partial front view showing the means for positioning the handles.

Fig. 5 is an enlarged partial plan view showing the application of heat.

Fig. 6 is an enlarged detail section showing construction of the burner.

The machine shown in the drawing for the purpose of illustrating and embodying my present invention consists of a main frame 14 of any preferred construction and having at its top a bed plate 15 upon which is mounted a bearing bracket or support 23 providing a bearing for a shaft 22. A power shaft 18 which is mounted in spaced bearings 17 of a bracket arm 16 extending out from main bracket 23 carries a driving pulley 19 at an end. Shaft 18 is provided with a worm 20 between the bearings 17. The worm 20 is in mesh with and continuously drives a worm gear 21 fast upon the shaft 22.

Upon the shaft 22 is also fixed a wheel 24 of relatively large diameter which wheel acts as a conveyer for the bodies and handles being soldered. From this wheel a plurality of body carrying horns 25 extend outwardly radially over which the bodies to receive the handles may be inserted by the attendant. Adjacent each body horn is provided a weight 26 pivoted at 27 on the wheel rim 28, which weight is adapted to press the handle against the body, as will be presently described.

Viewing Fig. 1, it will be noted that the rotation is in counter clock-wise direction and the weights are positioned in front of the horn on which the can bodies are fed at or about a point indicated at *a*, located near the bottom of the upward half of the travel. The body and handle are positioned and the weight thereafter pressing down upon the handle and pressing it against the body serves to hold it throughout the operation. In order that the handle may be at a proper and uniform distance from the ends of the body an adjustable stop is provided, against which the end of the handle nearest the center of the wheel rests. This stop consists of a threaded rod 29 threaded through the rim and extending between an appropriate weight and horn, a lock nut 31 being provided to hold the rod 29 in adjusted relation. The wheel shown in the drawing is provided with twelve sets of body and handle carrier devices, each set consisting of a horn, a weight and a stop. The machine shown in the drawing for illustrating my invention is adapted to receive handles and bodies to which the solder is already applied, the solder being carried either by the handle or by the body, it only being necessary in the soldering operation of the present machine that sufficient heat be applied to effect the soldering. This heat is automatically applied for a desired period by a heating device shown in detail in Figs. 2, 5 and 6. The heating device is carried upon the end of an arm or lever 32 which is loosely pivoted upon the shaft 22. One arm of this lever carries a combustible mixture distributing chamber 33 secured upon the end of the arm by bolts or other fastening means 34 and also by a conduit 35 extending through the lever 32 and connected with a mixing chamber 36, into which air and gas may be introduced from conduits 37 and 38, said conduits being flexible and merely indicated on the drawing. The distributing chamber 33 is located adjacent the path of movement of the body and handle. In the present instance the body indicated at 39 is adapted to have the handle indicated at 41 secured to it at two points 42 and there are accordingly two nozzles 43 extending out from the distributing chamber and adapted to direct the flame against the two contacting portions 42 of the handle and body. The movement of the wheel is continuous and the movement of the heating device a. reciprocating one, one portion of the reciprocating movement being coincident with the movement of the wheel and constituting a soldering movement of the apparatus. The heating device moves with the wheel throughout an arc of its travel and until the soldering is completed and then back into appropriate relation with the next succeeding handle and body in the idle motion of its reciprocation. This movement is controlled by an action of the wheel itself and during the forward or operative stroke of the heating device it is connected with the wheel. To this end a latch 44 is pivoted at 45 on the lever 32 and carries a hooked end 46 adapted to engage over any one of pins 47 corresponding in number and arrangement to the number of sets of body and handle carriers and extending out from the annulus 48 mounted concentric with the wheel and in the present instance forming a part thereof. A spring 49 engaging the latch at one end and the lever at the other tends to pull the latch toward the center or fulcrum of the lever, a stop 51 being provided to limit the movement of the latch under the action of the spring. This stop engages an upwardly extending arm 52 forming a part of the latch and this arm is also engageable by a stationary stop 53 fixed within a housing 54 for the heating device and supported at one end from the bearing support 23 of which in the present instance it forms a part and at the other by a downwardly extending leg 55 resting upon the bed plate 15. This stop is located at the limit of the forward movement of the heating device and the arm 52 upon engaging it lifts the latch 44 out of engagement with the pin 47 with which said latch is then coöperating. When the latch is disengaged the weight of the lever or arm 32 causes it to fall back in a counter clock-wise direction, the spring 49 and stop 51 disposing the hook 46 in the path of movement of the next succeeding pin 47, this gravity movement producing the return or idle stroke or reciprocation of the heating device. After the cans are soldered they continue around until they reach a point substantially at *b* near the bottom of the downward movement of the wheel. The weight 26 falling by gravity away from the handle releases the pressure upon the handle and body and the finished cup or container falls by gravity off the horn, freeing it to receive a new body when it arrives at the receiving station.

It is thought that the invention and many of its attendant advantages will be better understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:

1. A machine for soldering handles to bodies and the like, comprising in combination a conveyer for receiving the bodies and handles, devices for holding against each other said handles and bodies in predetermined relation and a soldering device for soldering said handles to said bodies while on said conveyer, and means for moving said holding devices and said soldering device, the latter with intermittent motion in a path parallel with said conveyer and from one body to another to coöperate with different holding devices.

2. A machine for soldering handles to bodies and the like, comprising in combination a rotating conveyer for receiving the bodies and handles, devices for holding said handles and bodies in predetermined relation and a soldering device for soldering said handles to said bodies while on said conveyer, and means for moving said holding devices and said soldering device in concentric arcuate paths and for moving the soldering device from one holding device to another.

3. A machine for soldering handles to bodies and the like, comprising in combination a conveyer, devices movable with said conveyer for holding said handles in proper relation with said bodies and a soldering device for soldering said handles to said bodies while so held, and means for moving said holding devices and said soldering device in concentric arcuate paths and for moving the soldering device from one holding device to another.

4. A machine for soldering handles to bodies and the like, comprising in combination a conveyer for receiving the bodies and handles, yielding pressure devices for holding said handles in proper relation to said body and a soldering device for soldering said handles to said bodies while so held, and means for moving said holding devices and said soldering device in concentric arcuate paths and for moving the soldering device from one holding device to another.

5. A machine for soldering handles to bodies and the like, comprising in combination a conveyer, adjustable devices carried thereby for accurately positioning said handles with respect to said bodies and a soldering device for soldering said handles to said bodies while on said conveyer, and means for moving said adjustable devices and said soldering device in parallel arcuate paths and for moving the soldering device from one holding device to another.

6. A machine for soldering handles to bodies and the like, comprising in combination a conveyer for receiving the bodies and handles and a soldering device coöperable with all of said bodies and handles and movable with said conveyer throughout a portion of its travel and with the handle and body carried thereon for soldering said handle to said body, and means for moving said bodies and handles and soldering device in parallel arcuate paths.

7. A machine for soldering handles to bodies and the like, comprising in combination a conveyer movable in an arcuate path in a vertical plane and provided with means for grasping the bodies and handles and a soldering device movable in an arcuate path in a vertical plane and coöperable with all of said bodies and handles and having a reciprocating motion, one portion of which is coincident with the motion of said conveyer, said device soldering a handle to said body at each said coincident motion.

8. A machine for soldering handles to bodies and the like, comprising in combination a wheel, means for positioning and holding against each other handles and bodies in proper relation to said wheel and a soldering device movable with the wheel and reversely movable for soldering said handles to said bodies while on said wheel.

9. A machine for soldering handles to bodies and the like, comprising in combination a wheel having radially extending grasping carriers for said bodies and said handles and a soldering device movable with said wheel during a soldering operation and reversely movable to another position for soldering said handles to said bodies while on said carriers.

10. A machine for soldering handles to bodies and the like, comprising in combination a wheel having relatively movable handle and body carriers extending radially outwardly from said wheel and acting to press together each body and handle, and a soldering device movable with said wheel for soldering said handles to said bodies while on said wheel.

11. A machine for soldering handles to bodies and the like, comprising in combination a continuously movable conveyer provided with horns and contiguous movable handle holders for conveying said bodies and said handles and a reciprocating soldering device for soldering said handles to said bodies, means for connecting the soldering device with the conveyer to move therewith during a soldering operation, and means for disconnecting the soldering device to move to another article to be soldered.

12. A machine for soldering handles to bodies and the like, comprising in combination a wheel for carrying said handles and said bodies in proper relation and a soldering device movable with said wheel and having means whereby it is intermittently connected thereto for soldering said handles to said bodies.

13. A machine for soldering handles to bodies and the like, comprising in combination a conveyer rotating in a vertical plane for carrying said handles and said bodies and a reciprocating soldering device for soldering said handles to said bodies, and means for connecting said device intermittently with said conveyer, one motion of said reciprocation being produced by said conveyer and the other motion of said reciprocation being produced by other power.

14. A machine for soldering handles to bodies and the like, comprising in combination a wheel adapted to carry handles and bodies to be soldered together and a soldering device pivotally mounted on the axis of said wheel and means whereby the soldering device is intermittently connected to said wheel to cause it to travel with the body and handle during the soldering operation.

15. A machine for soldering handles to bodies and the like, comprising in combination a wheel having a plurality of handle and body carriers, a soldering device mounted on the axis of said wheel and having the center of gravity off said axis, coöperating connecting members on said wheel and soldering device for causing said soldering device to move with said wheel and a trip for disengaging said soldering device from said wheel after a predetermined movement.

16. A machine for soldering handles to bodies and the like, comprising in combination a wheel having a plurality of handle and body carriers, a soldering device movable about the axis of said wheel and coöperating members automatically engaging to cause said soldering device to move with said wheel during the soldering operation and means for disengaging said soldering device and said wheel at the end of a predetermined movement.

17. A machine for soldering handle members to body members where one of said members is provided with solder, comprising a conveyer for conveying said handles and bodies in a circular path and a reciprocating heating device movable in a curved path concentric with that of said handles and bodies for applying heat to said solder of all of said articles, means for connecting the heating device with the conveyer to move therewith during a soldering operation, and means for disconnecting the heating device to move to another article to be soldered.

18. A machine for soldering handle members to body members where said members are previously provided with solder, comprising a wheel for carrying said handle members and body members and a heating device movable about the axis of said wheel and having an intermittent motion coincident with a part of the travel of each said body member and handle member, and having a movement relative to said wheel from soldered articles to articles to be soldered.

19. A machine for soldering handles to bodies comprising in combination a conveyer provided with a series of radially extending horns for receiving the bodies, and pressure members movable toward and from said horns for engaging the handles and pressing them against said bodies, and stops adjustable parallel with the horns respectively for relatively positioning the parts to be soldered.

20. A machine for soldering handles to bodies comprising in combination a conveyer provided with a horn for receiving the bodies, pressure members for engaging the handles and pressing them against said bodies and stops for determining the distance of said handles from the ends of said bodies.

21. In a soldering machine the combination of a carrier rotating in a substantially vertical plane, a series of horns thereon extending away from the center of the carrier and adapted to enter within the body to be soldered, handle-grasping elements movably mounted on the carrier contiguous with the said horns, and movable soldering devices adapted to coöperate with any one of the sets of parts to be soldered, and means whereby the soldering device is caused to move with the carrier during a soldering operation and then to move from a set of soldered parts to a set of unsoldered parts.

22. In a soldering machine the combination of a series of holders for articles to be soldered, means for moving said holders in a circular path, and a soldering device adapted to coöperate with each of said holders, and means whereby said soldering device is moved in an arcuate path in parallelism with said holders and is intermittently moved from one holder to another holder.

Signed in the presence of two subscribing witnesses.

IRVING ADAM PRYDE

Witnesses:
I. J. MARCUSE,
J. H. SMITH.